United States Patent
Hsiao et al.

(10) Patent No.: US 9,432,600 B2
(45) Date of Patent: Aug. 30, 2016

(54) SENSOR DEVICE WITH DARK CURRENT COMPENSATION AND CONTROL METHOD THEREOF

(71) Applicants: Pai-Heng Hsiao, Hsin-Chu (TW); Chuan-Hsin Lee, Hsin-Chu (TW); Chao-Chi Lee, Hsin-Chu (TW); Chia-Hsun Wu, Hsin-Chu (TW); En-Feng Hsu, Hsin-Chu (TW)

(72) Inventors: Pai-Heng Hsiao, Hsin-Chu (TW); Chuan-Hsin Lee, Hsin-Chu (TW); Chao-Chi Lee, Hsin-Chu (TW); Chia-Hsun Wu, Hsin-Chu (TW); En-Feng Hsu, Hsin-Chu (TW)

(73) Assignee: PIXART IMAGING INCORPORATION, Hsin-Chu (TW)

( * ) Notice: Subject to any disclaimer, the term of this patent is extended or adjusted under 35 U.S.C. 154(b) by 174 days.

(21) Appl. No.: 14/471,743

(22) Filed: Aug. 28, 2014

(65) Prior Publication Data
US 2015/0069222 A1 Mar. 12, 2015

(30) Foreign Application Priority Data
Sep. 6, 2013 (TW) .............................. 102132106 A

(51) Int. Cl.
*H04N 5/378* (2011.01)
*H04N 5/361* (2011.01)

(52) U.S. Cl.
CPC .................................... *H04N 5/361* (2013.01)

(58) Field of Classification Search
CPC ............. G01N 27/4074; G01N 31/00; G01N 21/3504; H04N 5/378
USPC ........... 250/214 R, 214.1, 221, 208.1, 222.2; 73/1.02, 23.2, 23.31; 356/437.8; 327/514, 515
See application file for complete search history.

(56) References Cited

U.S. PATENT DOCUMENTS 8,711,129 B2 * 4/2014 Hotelling .............. G06F 3/0418
178/18.01

* cited by examiner

*Primary Examiner* — Que T Le
(74) *Attorney, Agent, or Firm* — Tung & Associates

(57) ABSTRACT

The present invention discloses a sensor device with dark current compensation and control method thereof. The sensor device includes: a sensor circuit, for sensing a physical property or a chemical property to generate an analog sensing signal; a dark current compensation circuit, which is coupled to the sensor circuit, for processing the analog sensing signal and generating an analog compensated signal according to a reference signal; and a convertor circuit, which is coupled to the dark current compensation circuit, for generating a digital sensing signal according to the analog compensated signal.

20 Claims, 6 Drawing Sheets

SENSOR DEVICE WITH DARK CURRENT COMPENSATION AND CONTROL METHOD THEREOF

CROSS REFERENCE

The present invention claims priority to TW 102132106, filed on Sep. 6, 2013.

BACKGROUND OF THE INVENTION

1. Field of Invention

The present invention relates to a sensor device with dark current compensation and a control method thereof; particularly, it relates to such sensor device and control method thereof which generate an analog compensated signal with dark current compensation according to an analog sensing signal.

2. Description of Related Art

FIG. 1A shows a schematic diagram of a typical sensor device 100. As shown in FIG. 1A, the sensor device 100 includes: a sensor circuit 11, an analog gain circuit 13, an analog-to-digital converter (ADC) circuit 15, and a digital processing circuit 18. The sensor circuit 11 senses a physical property or a chemical property (sensed property hereinafter) of an object or an environment to generate an analog sensing signal. The analog gain circuit 13 receives the analog sensing signal, and generates an analog gain signal. The ADC circuit 15 receives the analog gain signal, and converts it to a digital gain signal. The digital processing circuit 18 receives the digital gain signal, and removes a power noise and a dark current therein to generate a digital sensing signal. As shown in FIG. 1B, the analog sensing signal includes a power noise signal PN, a dark current signal DC, and a target signal SIG.

The sensor device 100 for example is an image sensor device, and the sensor circuit 11 for example is an image sensor circuit. The image sensor circuit senses an image to generate the analog sensing signal. The analog gain circuit 13 amplifies the analog sensing signal to generate the analog gain signal, wherein the analog gain signal includes a power noise signal PN1, a dark current signal DC1, and a target signal SIG1 as shown in FIG. 1B, wherein the target signal SIG is related to the sensed image. The power noise signal PN1, the dark current signal DC1, and the target signal SIG1 are obtained by amplifying the power noise signal PN, the dark current signal DC, and the target signal SIG respectively. The ADC circuit 15 converts the analog gain signal to the digital gain signal. The digital processing circuit 18 removes a power noise signal PN2 and a dark current signal DC2 in the digital gain signal to generate the digital sensing signal. However, referring to FIG. 1B, the information in the digital sensing signal may be lost during the above process. This is because the analog sensing signal which includes the power noise signal PN, the dark current signal DC and the target signal SIG is amplified by the analog gain circuit 13, and the generated analog gain signal may exceed an overflow level as shown in the figure. Information in the portion of the analog gain signal above the overflow level is discarded. For example, when the sensor device 100 processes in a high temperature environment, the dark current doubles for every 6-7 degrees increase of the ambient temperature. For a more specific example, a car electronic equipment with the sensor device 100 may operate at an ambient temperature between 80 to 100 degrees Celsius. As compared with operating at a room temperature of 25 degrees Celsius, the dark current generated by the sensor device 100 may increase dozens of times or more. Therefore, the analog gain signal which is obtained by amplifying the analog sensing signal may exceed the overflow level because the dark current signal is too high. Excess portion of the analog gain signal over the overflow level is discarded. Referring to FIG. 1B, the target signal SIG1 and part of the dark current signal DC1 of the analog gain signal are discarded because of overflow, so the ADC circuit 15 converts the remaining part of the analog gain signal with only the power noise signal PN1 and the remaining part of the dark current signal DC1 to the digital sensing signal which includes only the dark current signal DC2 and the power noise signal PN2. The digital processing circuit 18 removes the dark current signal DC2 and the power noise signal PN2 to generate the digital sensing signal, but the digital sensing signal is null because the digital gain signal loses the information of the target signal SIG1 which is discarded because of overflow. Note that the signal bar chart is for illustrative purpose, not for limiting the distribution of the power noise signal, the dark current signal, and the target signal. For example, the target signal SIG1 does not have to be on top of the analog gain signal bar chart. No matter where the target signal SIG1 locates in the analog gain signal bar chart, it will be lost in the digital sensing signal if overflow occurs.

The power noise signal PN is generated from a noise of a power source, which is well known by those skilled in the art, so details thereof are omitted here. The target signal SIG may be lost in the prior art sensor device 100 when it, for example, processes in a high temperature environment, which causes the dark current signal of the analog gain signal to increase dramatically. In this case, no image will be taken and outputted by the image sensor device.

In view of above, to overcome the drawbacks in the prior art, the present invention proposes a sensor device with dark current compensation and a control method thereof, which can retain the target signal under a high dark current condition, such that the target signal is not lost when the analog sensing signal is converted to the digital sensing signal.

SUMMARY OF THE INVENTION

The present invention provides a sensor device with dark current device, including: a sensor circuit, for sensing a physical property or a chemical property to generate an analog sensing signal; a dark current compensation circuit, which is coupled to the sensor circuit, for processing the analog sensing signal according to a reference signal to generate an analog compensated signal; and a conversion circuit, which is coupled to the dark current compensation circuit, for generating a digital sensing signal according to the analog compensated signal.

The present invention also provides a control method of a sensor device with dark current compensation, including: sensing a physical property or a chemical property to generate an analog sensing signal; processing the analog sensing signal according to a reference signal to generate an analog compensated signal; and generating a digital sensing signal according to the analog compensated signal.

In one preferable embodiment, the reference signal is correlated to one or more of the following parameters or their variations: an ambient temperature; a gain; and an exposure time.

In one preferable embodiment, the dark current compensation circuit processes the analog sensing signal by one or more of the following operations: a linear operation; a non-linear operation; a look-up operation; and a scaling operation.

In one preferable embodiment, the sensor circuit includes: at least one sensor device, for sensing the physical property or the chemical property to generate a physical sensing signal and a physical background signal, or to generate a chemical sensing signal and a chemical background signal; and a correlated double sampling (CDS) circuit, which is coupled to the sensor device, for generating the analog sensing signal according to the physical sensing signal and the physical background signal, or according to the chemical sensing signal and the chemical background signal.

In the aforementioned embodiment, the sensor device preferably includes: a first sensor device, for sensing the physical property or the chemical property to generate the physical sensing signal or the chemical sensing signal; and a second sensor device, for sensing a background property to generate a first physical background signal or a first chemical background signal; wherein the first physical background signal or the first chemical background signal is for use in generating the reference signal.

In the aforementioned embodiment, the sensor device preferably further includes a third sensor device, for sensing the background property to generate a second physical background signal or a second chemical background signal; wherein the conversion circuit generates the digital sensing signal further according to the second physical background signal or the second chemical background signal.

In one preferable embodiment, the dark current compensation circuit includes: a pre-processing conversion circuit, which is coupled to the sensor circuit, for processing the analog sensing signal according to the reference signal to generate a pre-processed analog signal; and an analog gain circuit, which is coupled to the pre-processing conversion circuit, for generating the analog compensated signal according to the pre-processed analog signal.

In the aforementioned embodiment, the conversion circuit preferably includes: an analog-to-digital convertor (ADC) circuit, which is coupled to the analog gain circuit, for converting the analog compensated signal to a digital compensated signal; a power noise cancellation (PNC) circuit, which is coupled to the ADC circuit, for generating a PNC signal according to the digital compensated signal; and an automatic background signal cancellation circuit, which is coupled to the PNC circuit, for generating the digital sensing signal according to the PNC signal.

In the aforementioned embodiment, the dark current compensation circuit preferably further includes: a background signal analysis circuit for generating a background analysis signal, wherein the background analysis signal relates to a background of the sensed physical property or chemical property; and a reference signal determination circuit, which is coupled to the background signal analysis circuit, for generating the reference signal according to the background analysis signal.

In one preferable embodiment, the dark current compensation circuit processes the analog sensing signal such that the analog compensation signal is below an overflow level and above a lower minimum level, whereby the analog compensated signal does not have any portion above the overflow level which is discarded in generating the digital sensing signal.

The objectives, technical details, features, and effects of the present invention will be better understood with regard to the detailed description of the embodiments below.

DESCRIPTION OF THE PREFERRED EMBODIMENTS

Figure 1A:
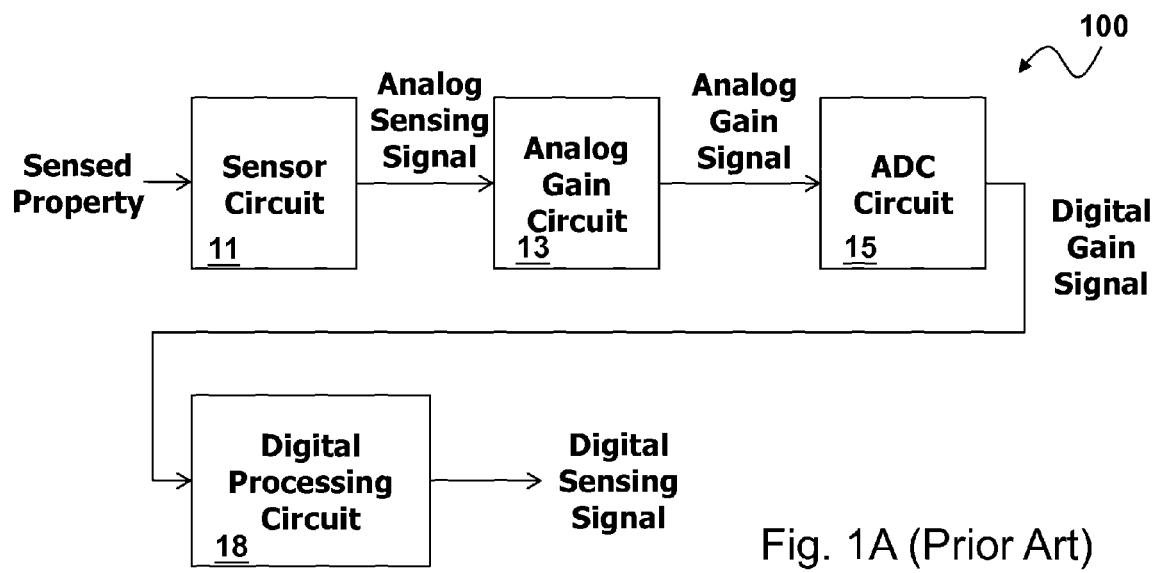
FIG. 1A shows a schematic diagram of a prior art sensor device 100.
Figure 1B:
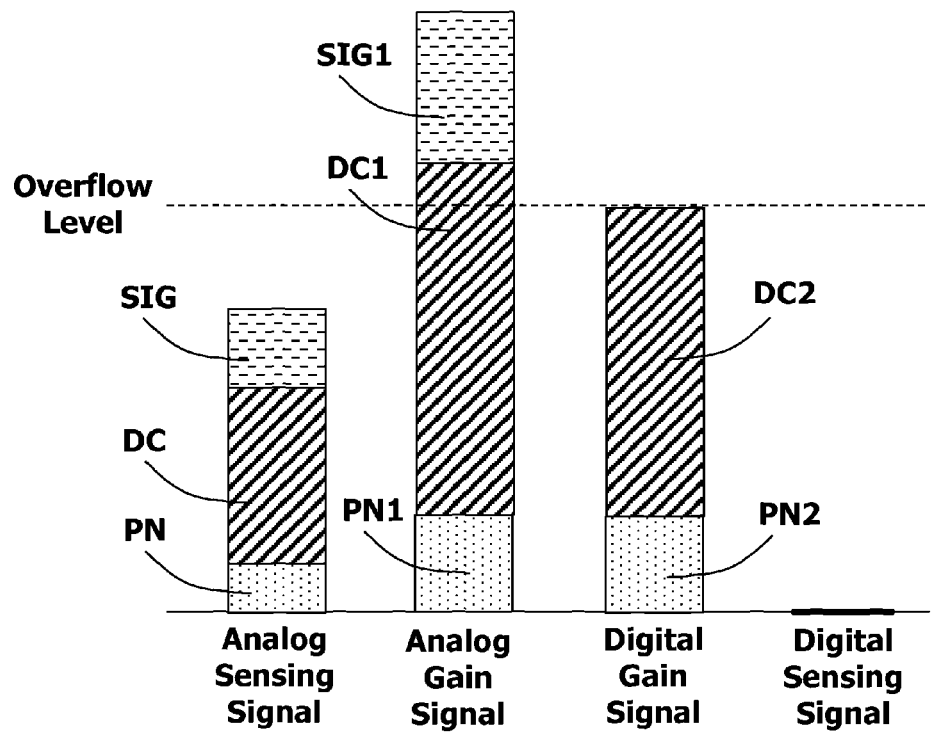
FIG. 1B shows a schematic signal bar chart of the prior art sensor device 100.
Figure 2A:
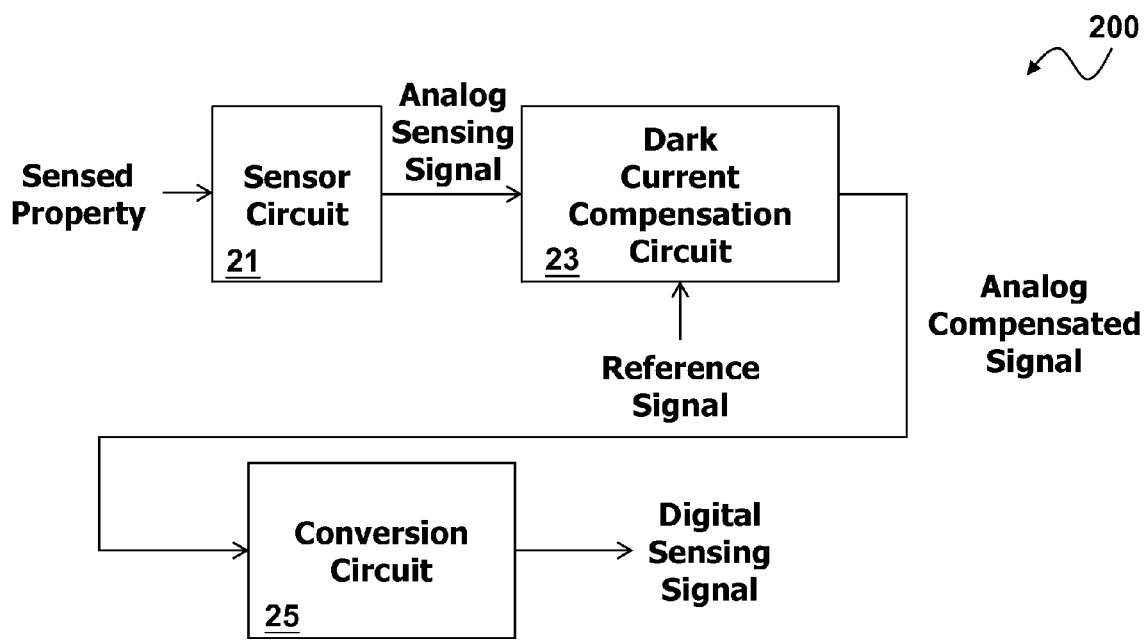
FIGS. 2A-2B show a first embodiment of the present invention.
Figure 2B:
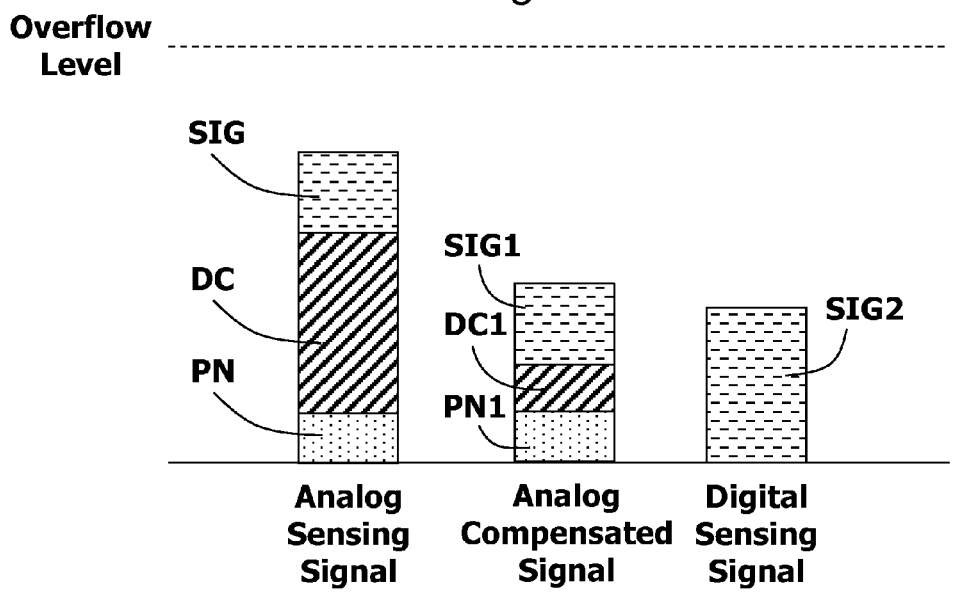

Please refer to FIGS. 2A-2B for a first embodiment according to the present invention. FIG. 2A shows a schematic diagram of a sensor device 200 with dark current compensation. As shown in FIG. 2A, the sensor device 200 with dark current compensation includes a sensor circuit 21, a dark current compensation circuit 23, and a conversion circuit 25. The sensor circuit 21 converts a physical property or a chemical property to an analog sensing signal. The dark current compensation circuit 23 is coupled to the sensor circuit 21, and processes the analog sensing signal according to a reference signal to generate an analog compensated signal. The conversion circuit 25 is coupled to the dark current compensation circuit 23 for generating a digital sensing signal according to the analog compensated signal. The sensor device 200 is for example but not limited to an image sensor device. The sensor circuit 21 is for example but not limited to an image sensor circuit. The image sensor circuit senses an image to generate the analog sensing signal. The dark current compensation circuit 23 processes the analog sensing signal according to the reference signal to generate the analog compensated signal. The conversion circuit 25 generates the digital sensing signal according to the analog compensated signal.

FIG. 2B shows a schematic signal bar chart of the sensor device 200. As shown in FIG. 2B, the analog sensing signal includes a power noise signal PN and a dark current signal DC, besides a target signal SIG. This embodiment is different from the prior art in that the analog sensing signal is pre-processed while it is in analog form before it is converted to a digital signal. The dark current compensation circuit 23 processes the analog sensing signal according to the reference signal to generate the analog compensated signal as shown in FIG. 2B, wherein the analog compensated signal which includes a target signal SIG1, a power noise signal PN1 and a dark current signal DN1 does not exceed the overflow level. The target signal SIG1 in the analog compensated signal can be retained, because the analog compensated signal is lower than the overflow level. The analog compensated signal does not have any portion above the overflow level and therefore no portion is to be discarded in later analog-to-digital conversion. The conversion circuit 25 removes the power noise signal PN1 and the dark current signal DC1 in the analog compensated signal, and converts the analog compensated signal to the digital sensing signal which includes the digital target signal SIG2 converted from the analog target signal SIG1.

According to the present invention, the reference signal may be correlated to one or more of the following parameters or their variations ("variation" is a difference between the parameter at two time points): an ambient temperature, a gain, and an exposure time. For example, the reference signal may be correlated to the ambient temperature or its variation. As described in the above, the higher the ambient temperature is, the higher the dark current is. Therefore, the reference signal can be determined by sensing the ambient temperature or its variation and changing the reference signal accordingly (for example, the reference signal is increased as the ambient temperature increases, and the analog compensated signal is obtained by subtracting the reference signal or its related signal from the analog sensing signal); thus, the analog compensated signal may be adaptively adjusted according to the ambient temperature or its variation, such that the analog compensated signal does not exceeding the overflow level.

The "gain" indicates a ratio of the digital sensing signal to the analog compensated signal in the conversion circuit. The "exposure time" is the duration of exposure of the image sensor device in the image sensor circuit in taking one shot of an image. The aforementioned terms (the gain and the exposure time) are well known by those skilled in the art, so details thereof are omitted here.

According to the present invention, the dark current compensation circuit processes the analog sensing signal according to the reference signal by one or more of the following operations: a linear operation, a non-linear operation, a look-up operation, and a scaling operation. The linear operation indicates linear relations among the analog compensated signal, the analog sensing signal, and the reference signal. The non-linear operation indicates non-linear relations between the analog compensated signal, the analog sensing signal, and the reference signal. The look-up operation indicates that the analog compensated signal is generated by looking up a table according to the reference signal. The scaling operation indicates scaling the analog sensing signal to obtain the analog compensated signal, which includes for example but not limited to providing one or more threshold settings, comparing the reference signal with the one or more threshold settings to generate an operation setting, and processing the analog sensing signal according to the operation setting to generate the analog compensated signal which is a ratio of the analog sensing signal.

Figure 3A:
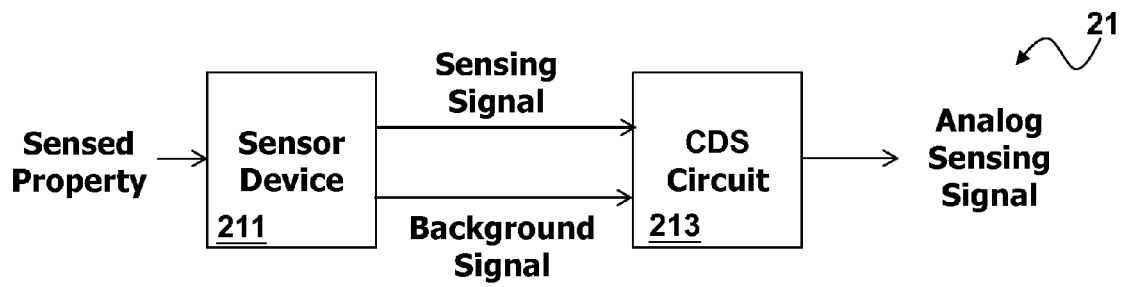
FIGS. 3A-3B show a second embodiment of the present invention.
Figure 3B:
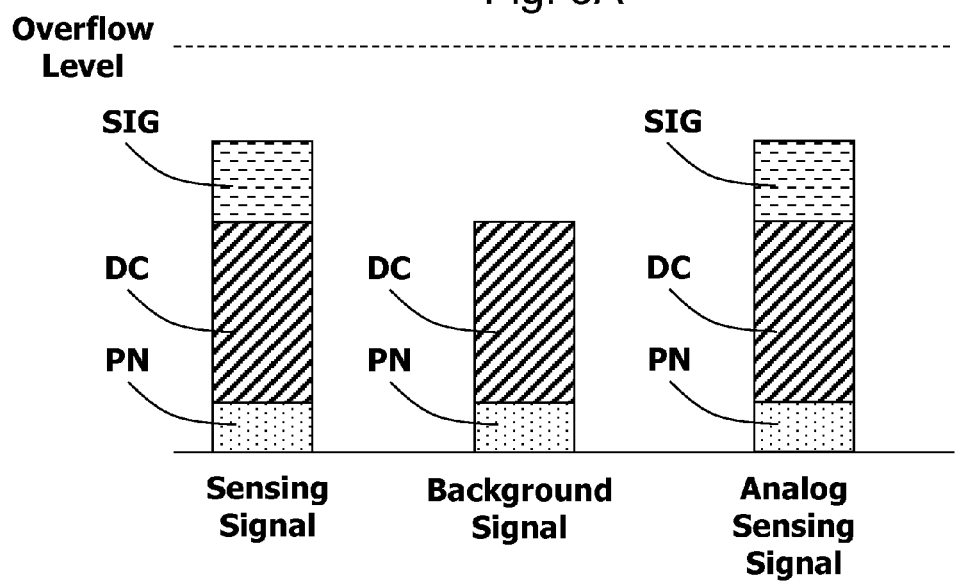

Please refer to FIGS. 3A-3B for a second embodiment according to the present invention. As shown in FIG. 3A, the sensor circuit 21 includes for example but not limited to a sensor device 211 and a correlated double sampling (CDS) circuit 213. The sensor device 211 senses the physical property or the chemical property (a sensed property hereinafter) to generate a physical sensing signal or a chemical sensing signal (a sensing signal hereinafter) and a physical background signal or a chemical background signal (a background signal hereinafter). The sensor circuit 21 is for example but not limited to an image sensor circuit. The sensor device 211 includes for example but not limited to plural image sensor devices, wherein some of the image sensor devices (normal image sensor devices hereinafter) sense the image to generate the image sensing signal related to a target image, and at least one other image sensor device (a background image sensor device hereinafter) is shielded by a shielding layer for sensing a background property without the target image to generate the background signal. The reference signal is generated according to for example but not limited to the background signal. The CDS circuit 213 generates the analog sensing signal according to the sensing signal and the background signal.

Please refer to FIG. 3B for a schematic signal bar chart of the sensor circuit 21 of the second embodiment. As shown in FIG. 3B, the sensing signal includes for example the target signal SIG, the power noise signal PN, and the dark current signal DC. The background signal includes the power noise signal PN and the dark current signal DC, but does not include the target signal SIG as compared with the sensing signal. The analog sensing signal is for example but not limited to the same as the sensing signal, including the target signal SIG, the power noise signal PN, and the dark current signal DC.

In the second embodiment, besides the above-mentioned background image sensor device, another background image sensor device may be provided for sensing the background property to generate another background signal, and the conversion circuit 25 can generate the digital sensing signal by further including the information of this other background signal. That is, one background signal may be used to generate the reference signal, and another background signal may be used (as a part of the analog sensing signal, or as a separate signal in combination with the analog sensing signal) to generate the digital sensing signal.

Figure 4A:
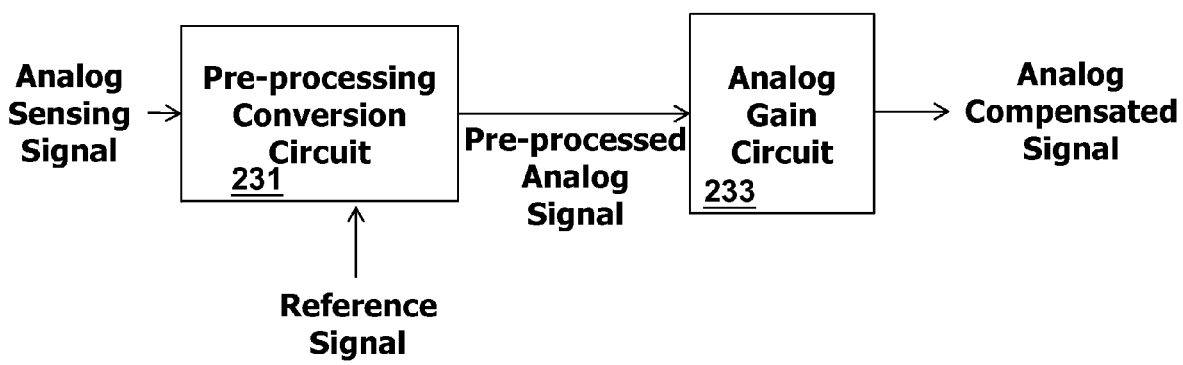
FIGS. 4A-4C show a third embodiment of the present invention.
Figure 4B:
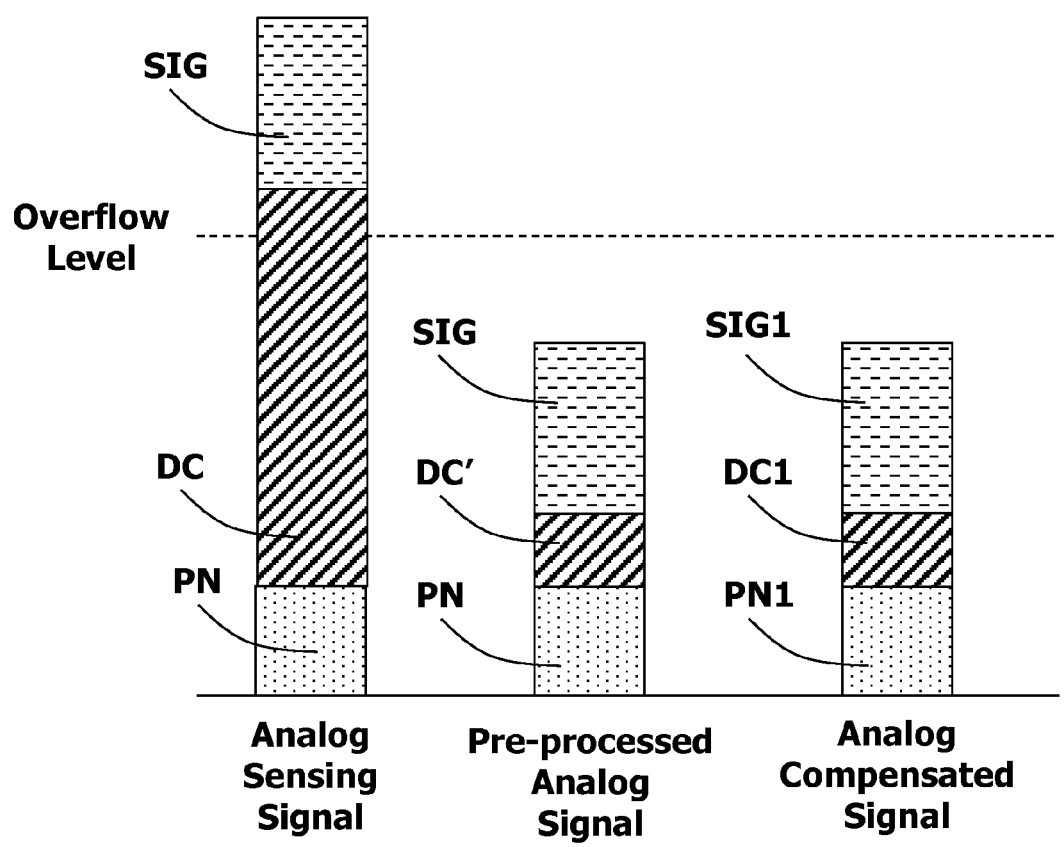
Figure 4C:
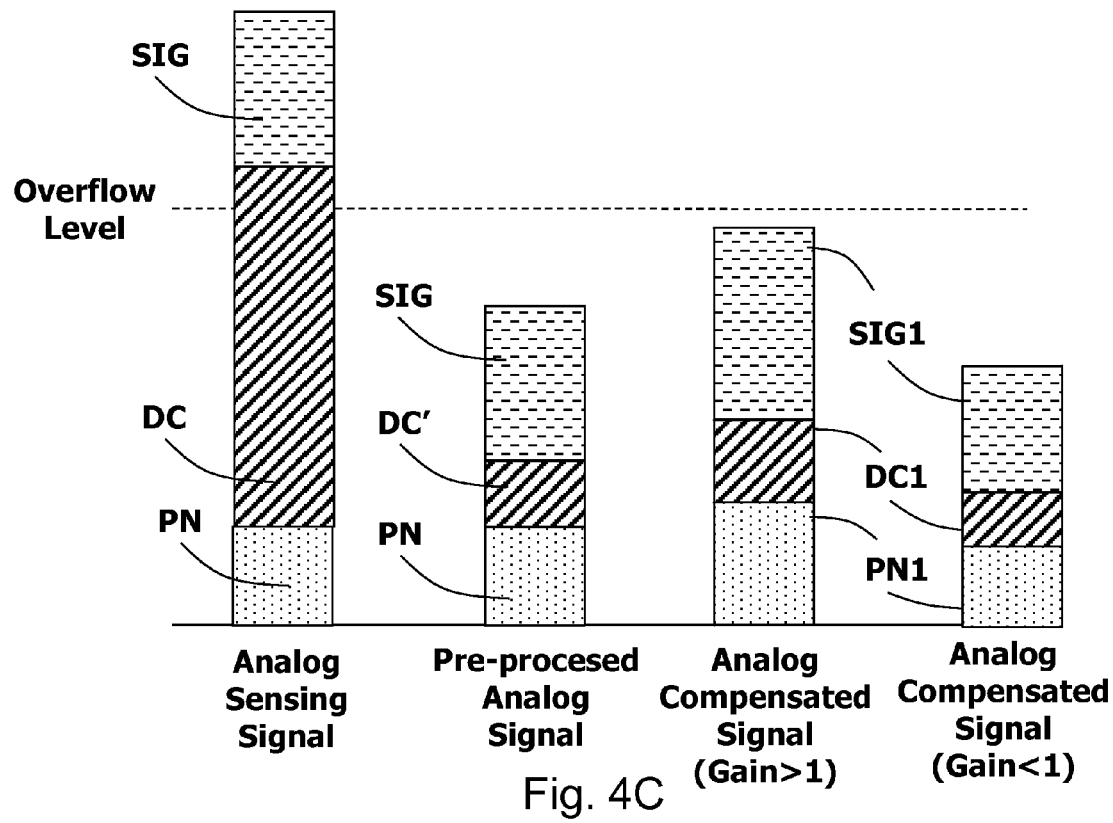

Please refer to FIGS. 4A-4C for a third embodiment according to the present invention. As shown in FIG. 4A, the dark current compensation circuit 23 includes a pre-processing conversion circuit 231 and an analog gain circuit 233. The pre-processing conversion circuit 231 is coupled to the sensor circuit, for processing the analog sensing signal according to the reference signal to generate a pre-processed analog signal. The analog gain circuit 233 is coupled to the pre-processing conversion circuit 231, for generating the analog compensated signal according to the pre-processed analog signal. A primary function of the pre-processing conversion circuit 231 is to pre-process the analog sensing signal and a predetermined signal (such as the aforementioned reference signal) by the aforementioned linear, non-linear, look-up, and/or scaling operation. For example, referring to FIG. 4B, the pre-processing conversion circuit 231 removes part of the analog sensing signal according to the reference signal which in this case is related to the dark current signal DC. As shown in FIG. 4B, because the reference signal is related to the dark current signal DC, a dark current signal DC' replaces the dark current signal DC according to the reference signal. Besides, the pre-processed analog signal is controlled not to exceed the overflow level as shown in FIG. 4B. In this embodiment, the analog gain circuit 233 converts the pre-processed analog signal to the analog compensated signal by for example a unity gain (gain=1). As shown in FIG. 4B, the pre-processed analog signal and the analog compensated signal are at a same level. According to the present invention, in another embodiment, the analog gain circuit 233 may convert the pre-processed analog signal to the analog compensated signal by a different conversion gain for example as shown in FIG. 4C.

Figure 5A:
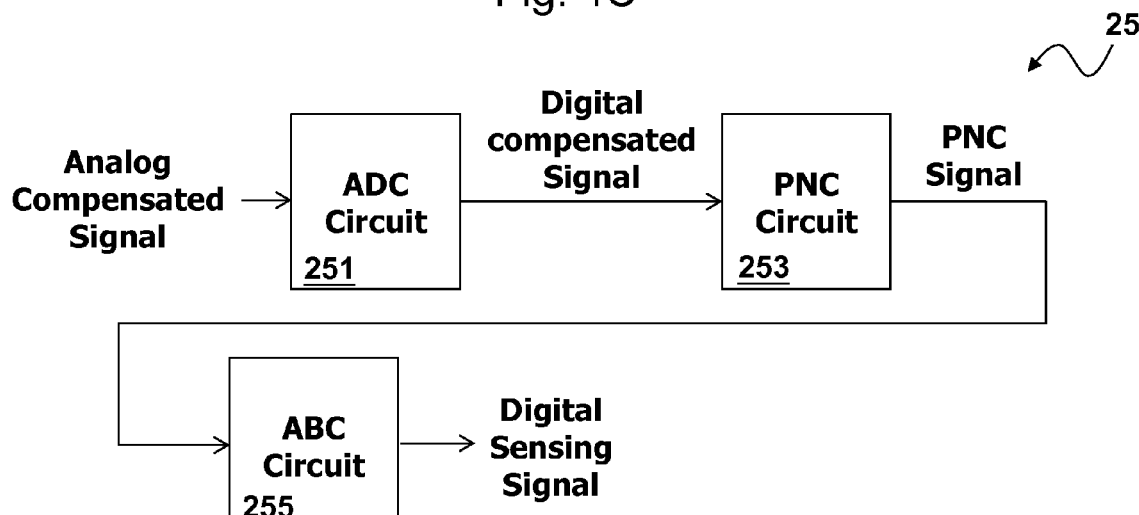
FIGS. 5A-5B show a fourth embodiment of the present invention.
Figure 5B:
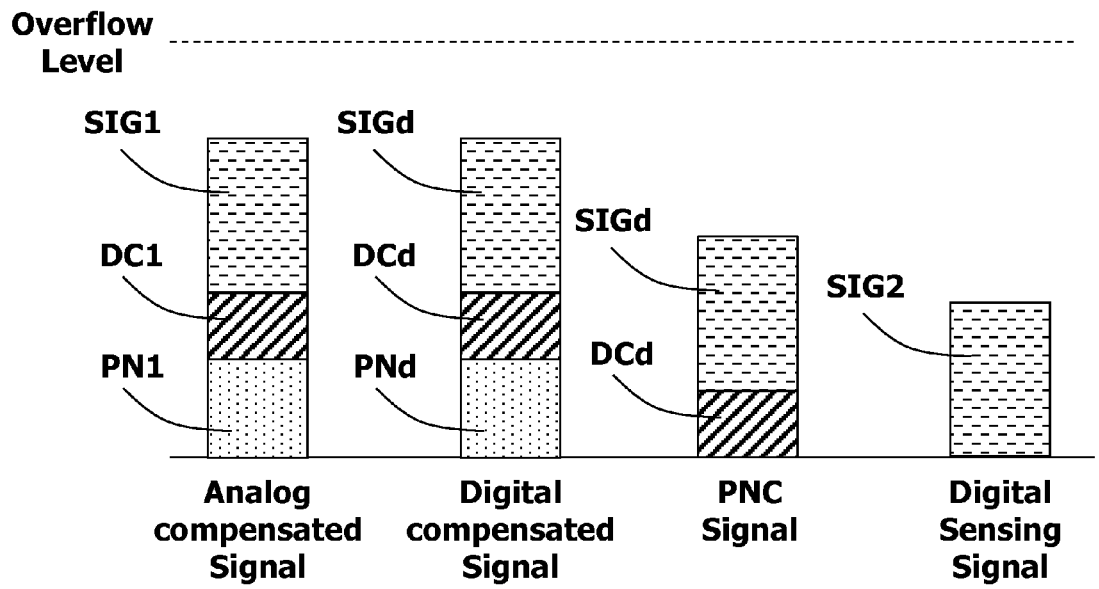

Please refer to FIGS. 5A-5B for a fourth embodiment according to the present invention. As shown in FIG. 5A, the conversion circuit 25 includes an analog-to-digital converter (ADC) circuit 251, a power noise cancellation (PNC) circuit 253, and an automatic background cancellation (ABC) circuit 255. The ADC circuit 251 is coupled to the analog gain circuit 233, for converting the analog compensated signal to the digital compensated signal. The PNC circuit 253 is coupled to the ADC circuit 251, for generating a PNC signal according to the digital compensated signal to. The automatic background cancellation (ABC) circuit 255 is coupled to the PNC circuit 253, for generating the digital sensing signal according to the PNC signal.

FIG. 5B shows a schematic signal bar chart of the conversion circuit 25. As shown in FIG. 5B, the analog compensated signal for example includes the target signal SIG1, the power noise signal PN1, and the dark current signal DC1. The ADC circuit 251 converts the analog compensated signal to the digital compensated signal. The analog-to-digital conversion is well known by those skilled in the art, so details thereof are omitted here. As shown in the figure, The ADC circuit 251 converts the target signal SIG1, the power noise signal PN1, and the dark current signal DC1 to a digital target signal SIGd, a digital power noise signal PNd, and a digital dark current signal DCd respectively. The PNC circuit 253 removes the power noise signal PNd in the digital compensated signal to generate the PNC signal. The ABC circuit 255 removes the dark current signal DCd to generate the digital sensing signal which includes the target signal SIG2, indicating the sensed physical property or chemical property. Certainly, other operations besides the operations of the ADC circuit 251, the PNC circuit 253 and the ABC circuit 255, may be added, for example but not limited to an amplification operation, linear operation, and non-linear operation etc.

Figure 6:
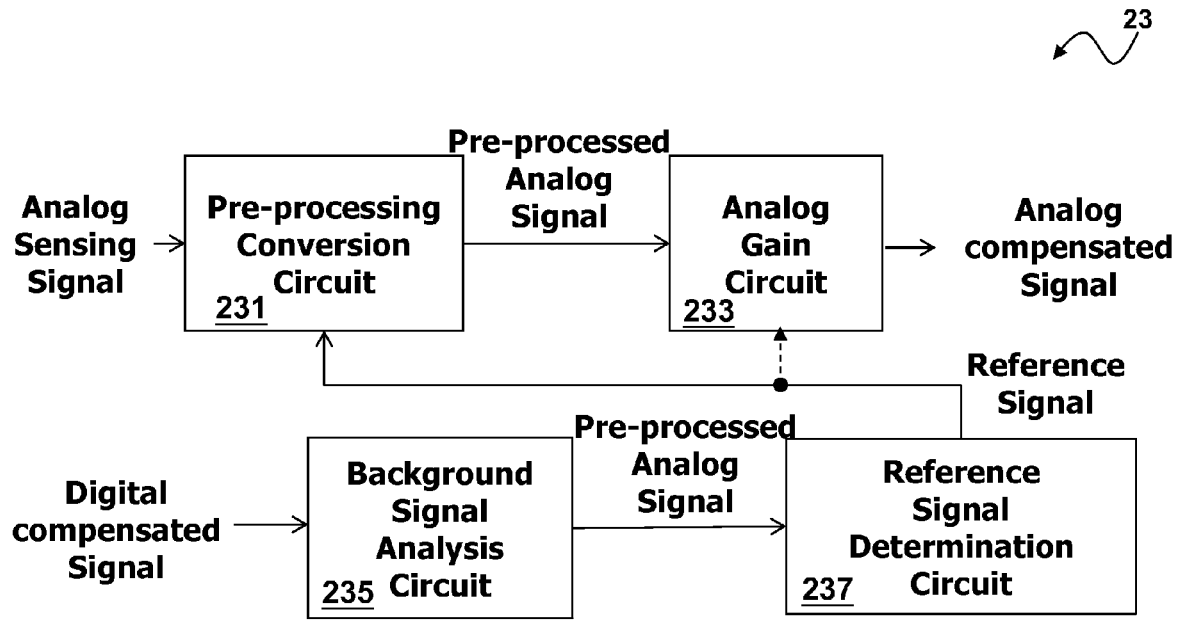
FIG. 6 shows a fifth embodiment of the present invention.

FIG. 6 shows a fifth embodiment of the present invention. As shown in FIG. 6, the dark current compensation circuit 23 further includes a background signal analysis circuit 235 and a reference signal determination circuit 237, in addition to the pre-processing conversion circuit 231 and the analog gain circuit 233 shown in the third embodiment. In this embodiment, the background analysis circuit 235 generates another pre-processed analog signal according to the digital compensated signal, which for example relates to a background of the sensed physical property or chemical property, and the reference signal determination circuit 237 generates the reference signal according to this pre-processed analog signal. The reference signal can be sent to the pre-processing conversion circuit 231, and/or the analog gain circuit 233. In another embodiment, the background analysis circuit 235 can generate the another pre-processed analog signal by analyzing the analog sensing signal.

Note that the reference signal can be generated in various other ways besides the aforementioned methods, as long as the reference signal is generated for compensating the dark current signal before the analog to digital conversion, and more specifically, to prevent the analog compensated signal from exceeding the overflow level, such that the information of the target signal SIG can be retained. Besides, according to the present invention, in addition to preventing the analog compensated signal from exceeding the overflow level, the dark current compensation circuit 23 may further process the analog sensing signal so that the analog compensation signal is below the overflow level and above a lower minimum level.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device or circuit that does not influence the main meanings of signals, such as a switch or a logic circuit, can be inserted between two devices or circuits that are shown to be in direction connection in the embodiments. For another example, the sensor device is not limited to an image sensor device, but may be other types of sensor devices such as an ultra-sonic sensor device, a gas sensor device, an pressure sensor device, or an acceleration sensor device, etc. In view of the foregoing, the spirit of the present invention should cover all such and other modifications and variations, which should be interpreted to fall within the scope of the following claims and their equivalents. Further, an embodiment or a claim of the present invention does not need to achieve all the objectives or advantages of the present invention. The title and abstract are provided for assisting searches but not for limiting the scope of the present invention.

What is claimed is:

1. A sensor device with dark current compensation, comprising:
   a sensor circuit, for sensing a physical property or a chemical property to generate an analog sensing signal;
   a dark current compensation circuit, which is coupled to the sensor circuit, for processing the analog sensing signal according to a reference signal and generating an analog compensated signal; and
   a conversion circuit, which is coupled to the dark current compensation circuit, for generating a digital sensing signal according to the analog compensated signal.

2. The sensor device of claim 1, wherein the reference signal is correlated to one or more of the following parameters or variations of the parameters: an ambient temperature; a gain; and an exposure time.

3. The sensor device of claim 1, wherein the dark current compensation circuit processes the analog sensing signal according to the reference signal by one or more of the following operations: a linear operation; a non-linear operation; a look-up operation; and a scaling operation.

4. The sensor device of claim 1, wherein the sensor circuit includes:
   at least one sensor device, for sensing the physical property or the chemical property to generate a physical sensing signal and a physical background signal, or to generate a chemical sensing signal and a chemical background signal; and
   a correlated double sampling (CDS) circuit, which is coupled to the sensor device, for generating the analog sensing signal according to the physical sensing signal and the physical background signal, or according to the chemical sensing signal and the chemical background signal.

5. The sensor device of claim 4, wherein the sensor device includes:
   a first sensor device, for sensing the physical property or the chemical property to generate the physical sensing signal or the chemical sensing signal; and
   a second sensor device, for sensing a background property to generate a first physical background signal or a first chemical background signal;
   wherein the first physical background signal or the first chemical background signal is for use in generating the reference signal.

6. The sensor device of claim 5, wherein the sensor device further includes a third sensor device, for sensing the background property, to generate a second physical background signal or a second chemical background signal;
   wherein the conversion circuit generates the digital sensing signal further according to the second physical background signal or the second chemical background signal.

7. The sensor device of claim 1, wherein the dark current compensation circuit includes:
   a pre-processing conversion circuit, which is coupled to the sensor circuit, for processing the analog sensing signal according to the reference signal to generate a pre-processed analog signal; and an analog gain circuit, which is coupled to the pre-processing conversion circuit, for generating the analog compensated signal according to the pre-processed analog signal.

8. The sensor device of claim 7, wherein the conversion circuit includes:
an analog-to-digital convertor (ADC) circuit, which is coupled to the analog gain circuit, for converting the analog compensated signal to a digital compensated signal;
a power noise cancellation (PNC) circuit, which is coupled to the ADC circuit, for converting the digital compensated signal to a PNC signal; and
an automatic background signal cancellation circuit, which is coupled to the PNC circuit, for generating the digital sensing signal according to the PNC signal.

9. The sensor device of claim 8, wherein the dark current compensation circuit further includes:
a background signal analysis circuit for generating a background analysis signal, wherein the background analysis signal relates to a background of the sensed physical property or chemical property; and
a reference signal determination circuit, which is coupled to the background signal analysis circuit, for generating the reference signal according to the background analysis signal.

10. The sensor device of claim 1, wherein the dark current compensation circuit processes the analog sensing signal such that the analog compensation signal is below an overflow level and above a lower minimum level, whereby the analog compensated signal does not have any portion above the overflow level which is discarded in generating the digital sensing signal.

11. A control method of a sensor device with dark current compensation, comprising:
sensing a physical property or a chemical property to generate an analog sensing signal;
processing the analog sensing signal according to a reference to generate an analog compensated signal; and
generating a digital sensing signal according to the analog compensated signal.

12. The control method of claim 11, wherein the reference signal is correlated to one or more of the following parameters or variations of the parameters: an ambient temperature; a gain; and an exposure time.

13. The control method of claim 11, wherein the dark current compensation circuit processes the analog sensing signal by one or more of the following operations: a linear operation; a non-linear operation; a look-up operation; and a scaling operation.

14. The control method of claim 11, wherein the step of sensing a physical property or a chemical property to generate an analog sensing signal includes:
sensing the physical property or the chemical property to generate a physical sensing signal and a physical background signal, or to generate a chemical sensing signal and a chemical background signal; and
generating the analog sensing signal according to the physical sensing signal and the physical background signal, or according to the chemical sensing signal and the chemical background signal.

15. The control method of claim 14, wherein the step of sensing the physical property or the chemical property to generate a physical sensing signal and a physical background signal or to generate a chemical sensing signal and a chemical background signal includes:
sensing the physical property or the chemical property to generate the physical sensing signal or the chemical sensing signal; and
sensing a background property to generate a first physical background signal or a first chemical background signal;
wherein the first physical background signal or the first chemical background signal is for use in generating the reference signal.

16. The control method of claim 15, wherein the step of sensing the physical property or the chemical property to generate a physical sensing signal and a physical background signal, or to generate a chemical sensing signal and a chemical background signal further includes: sensing the background property, to generate a second physical background signal or a second chemical background signal;
wherein the digital sensing signal is generated further according to the second physical background signal or the second chemical background signal.

17. The control method of claim 11, wherein the step of processing the analog sensing signal according to the reference signal to generate the analog compensated signal includes:
processing the analog sensing signal according to the reference signal to generate a pre-processed analog signal; and
generating the analog compensated signal according to the pre-processed analog signal.

18. The control method of claim 17, wherein the step of generating the digital sensing signal according to the analog compensated signal includes:
converting the analog compensated signal to a digital compensated signal;
generating a PNC signal according to the digital compensated signal; and
generating the digital sensing signal according to the PNC signal.

19. The control method of claim 18, wherein the step of processing the analog sensing signal according to the reference signal to generate an analog compensated signal further includes:
generating a background analysis signal, wherein the background analysis signal relates to a background of the sensed physical property or chemical property; and
generating the reference signal according to the background analysis signal.

20. The control method of claim 11, wherein the analog compensation signal is below an overflow level and above a lower minimum level, whereby the analog compensated signal does not have any portion above the overflow level which is discarded in generating the digital sensing signal.

* * * * *